United States Patent

Johansson

[11] 4,026,490
[45] May 31, 1977

[54] SPICE MILL
[76] Inventor: Karl Figge Johansson, 7 Beckbrannarbacken, Stockholm, Sweden, S-116 35
[22] Filed: Mar. 1, 1976
[21] Appl. No.: 662,633
[52] U.S. Cl. .......................................... 241/169.1
[51] Int. Cl.² ...................................... A47J 42/04
[58] Field of Search ............... 241/168, 169, 169.1, 241/257 R

[56] References Cited
UNITED STATES PATENTS

| | | | |
|---|---|---|---|
| 197,982 | 12/1877 | Seifert et al. | 241/169.1 X |
| 2,479,151 | 8/1949 | Bostick | 241/169.1 |
| 2,763,440 | 9/1956 | Johnson | 241/168 X |
| 3,136,491 | 6/1964 | Posmanter | 241/257 R X |
| 3,633,834 | 1/1972 | Nissen | 241/169.1 |

Primary Examiner—Roy Lake
Assistant Examiner—Howard N. Goldberg
Attorney, Agent, or Firm—Pollock, VandeSande & Priddy

[57] ABSTRACT

A spice or pepper mill having a portion adapted to fit the opening of a commercial spice jar. The spice is kept in this jar and is dispensed by holding the jar upside down and rotating the housing relatively thereto.

5 Claims, 5 Drawing Figures

FIG. 1
FIG. 4
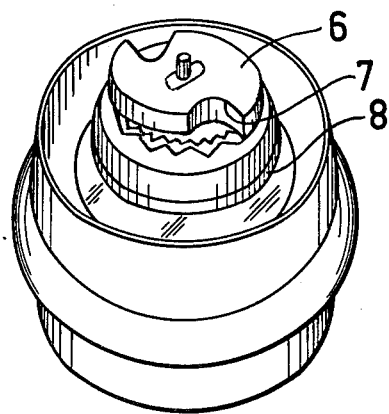
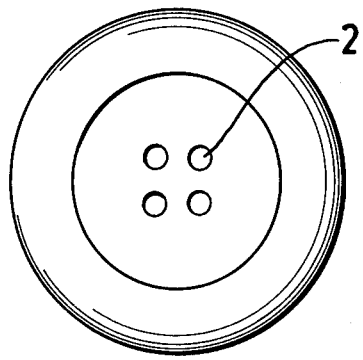
FIG. 2
FIG. 5
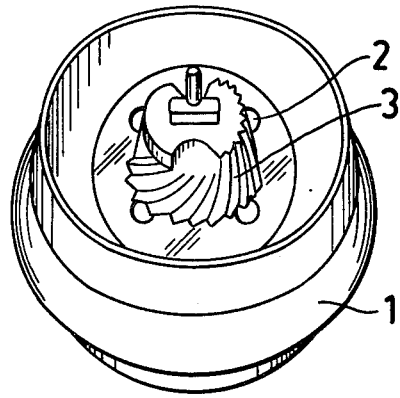
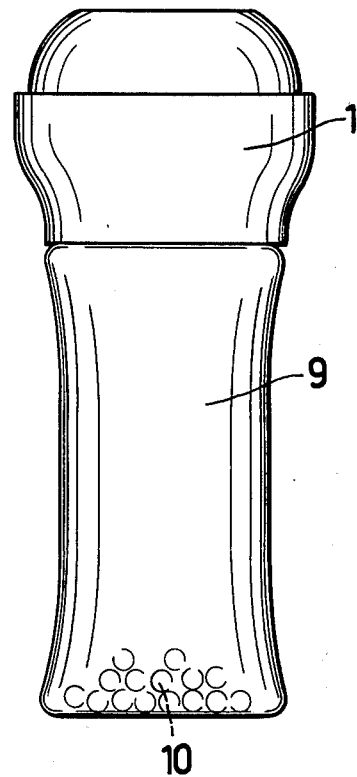
FIG. 3
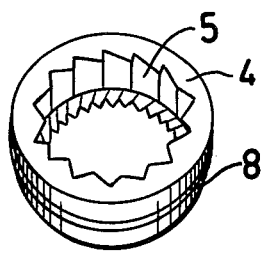

SPICE MILL

The present invention relates to spice or pepper mills, that is mills for grinding down spice grains or corns into minute particles.

Spices are apt to lose much of their freshness and flavour when kept for any extended length of time after being ground to a powder such as ordinarily used when flavouring or spicing food. Accordingly, table mills have been designed and commercialized for grinding spices immediately before use. The spices are ground and dispensed by holding the mill by one hand and rotating its top portion by the other. Most such mills cannot hold any sizable quantity of spices and must be re-loaded frequently. This procedure is often slow and tedious, necessitating feeding the spices more or less piecemeal into the mill.

It is an object, therefore, of the invention to provide a spice mill which can hold a generous quantity of spices at a time. It is a further object to provide a grinding mill assembly which can be attached to a spice jar which will form the base of the mill and which mill can be shifted between jars holding different spices or from an empty jar to a filled one.

With these and other objects in view, in a spice mill comprising a grinding assembly and a base portion, said base portion comprises a jar for holding spices, one member of said grinding assembly having a portion adapted for frictionally engaging the mouth of said jar, a second member of said grinding assembly being rigidly connected with housing means affording a hand grip for rotating said second grinding member, longitudinal channel means extending through said housing means for dispensing powderized spices on rotating said second grinding member with the said jar being held upside down.

An embodiment of a pepper mill according to the invention will now be described by way of example, reference being had to the drawing. In the drawing, FIG. 1 is a perspective view of the grinding assembly, FIG. 2 is a similar view, the outer grinding member having been removed, FIG. 3 is a perspective view of the annulus-shaped outer grinding member, FIG. 4 is a top plan view of the grinding assembly housing, FIG. 5 is a side elevation view of the complete mill including the spice jar forming the base of the device.

A mill housing 1 is made of plastic or other suitable material. Longitudinal passages 2 extend through this housing, beginning at the circumference of a helically toothed frusto-conical grinding rotor 3 rigidly secured to the bottom of the housing 1 and constituting one member of a grinding assembly, the second or mating member being an annulus 4 shaped with grinding teeth or serrations 5 at the inner circumference (FIG. 3). These grinding teeth or serrations form two rows, one above the other. The upper row teeth (in the operative position of the mill, i.e. upside down) are larger-sized than those underneath, and serve principally to split the spice grains to facilitate their subsequent grinding between the smaller-sized teeth and the rotor teeth. The annulus 4 surrounds the rotor 3 coaxially with some small clearance, but there are spaced recesses formed either at the inside of the annulus 4 or at the outside of the rotor 3 or both to admit spice grains in between the teeth. The mill assembly is mounted at the top of a spice jar 9 (FIG. 5) and is fed with spice grains when turned upside down. To prevent the grains in the jar from amassing at the infeed of the mill thereby increasing excessively the resistance against turning, a feed plate 6 is rigidly secured to the top of the rotor 3 and is recessed at its periphery as at 7 so as admit only as many spice grains at a time to the grinding space as there are recesses 7. The number of recesses may be two, as illustrated, but can also be three or four, for example. Plate 6 also forms as axial stop for member 4.

The annulus 4 is shaped with an external concentrical groove wherein there is received a sealing ring 8 of a resiliently deformable material. This ring 8 serves to secure the housing 1 with a frictional and sealing engagement within the mouth of the spice jar 9. On holding the assembly upside down and rotating the housing 1 relative to the jar 9, the grinding rotor 3 will rotate within the annulus 4 and will pulverize grains of pepper, salt or other spices between the teeth of the rotor and the teeth or serrations of the annulus, the latter being held firmly against rotation by its engagement with the neck of the jar. The spice grains are fed from the jar 9 down into the recesses 7 of plate 6, and are caught between the grinding members. The plate 6 prevents the congestion of spice grains and stoppage of the grinding action with ensuing turning of the annulus 4 relative to the mouth of the jar by admitting only a few grains at a time at spaced points around the entrance to the grinding space.

The powderized spice goes down the passages 2 and exits at their opposite end at the top of the housing 1 which is facing downwards during the grinding procedure. After use, the pepper mill is turned into its inactive upright position, to rest upon the base, that is the spice jar 9.

If different spices are kept in uniform jars, it is a simple thing to shift the housing 1 with the grinding mechanism between the jars, as required. The sealing ring 8 should be made of a material sufficiently resilient to fit neck openings having a diameter differing within reasonably wide limits. The grinding assembly will engage the mouth of the jar 9 internally, and any threads or similar projections provided at the outside of the neck for engaging the closure lid of the jar will not interfere with this engagement.

The housing 1 with the grinding assembly can be given a distinctive and pleasing appearance. The annulus 4 and sealing ring 8 can be made in different sizes to suit spice jars having different neck diameters.

What I claim is:

1. A spice mill comprising a grinding assembly adapted to be removably attached to the open mouth of a spice jar, said grinding assembly comprising a grinding rotor adapted to be located within the mouth of said jar, said rotor having helical teeth at the outer circumference thereof, housing means, said grinding rotor being rigidly secured to said housing means, a second grinding member comprising an annulus the exterior of which is adapted to frictionally engage the inner surface of the mouth of said spice jar to fix said annulus against rotation relative to said jar, said annulus being disposed in surrounding spaced relation to said grinding rotor, tooth means formed on the inside of said annulus for defining together with said grinding rotor teeth a grinding space between said rotor and said annulus, an end plate mounted on said rotor at the end of said grinding space which faces the interior of said jar, said end plate providing an axial abutment for said grinding rotor and being formed with recesses at the periphery thereof to admit only separate grains of spice at a time to said grinding space when the jar with said grinding assembly mounted therein is so positioned that the mouth of said jar faces downwardly, said housing means affording a hand grip for rotating said grinding rotor, and said housing means including longitudinal passages communicating with said grinding space and extending to the exterior of said housing means for dispensing the ground spices from said grinding assembly.

2. A spice mill according to claim 1 including resilient ring means at the outer periphery of said annulus for sealingly and exchangeably fitting said annulus into the mouth of said spice jar.

3. A spice mill according to claim 1 wherein the inside of said annulus is provided with two superposed rows of grinding teeth having different sizes respectively, the teeth in the one of said rows closest to the interior of said jar being larger for splitting the spice grains which enter said grinding space from said jar, and the teeth in the other of said rows more remote from the interior of said jar being smaller for thereafter pulverizing said split grains.

4. In combination, a pepper mill, a spice jar having an open mouth at one end only thereof, means for frictionally and sealingly mounting said mill within said open mouth of said spice jar, said mill including a housing rigidly holding a toothed grinding rotor member within said mouth of said jar, said mill having an annular toothed grinding member also located within said mouth of said jar and coaxially surrounding said rotor member in spaced relation to said rotor member, said mounting means being located on said annular member, and passage means extending longitudinally through said housing for feeding pulverized spice out of said jar via said mill on rotation of said housing relative to said spice jar when said spice jar is so held that its mouth and the spice mill mounted therein are positioned at the lower end of said spice jar.

5. The combination of claim 4 including a feed plate rigidly attached to said grinding rotor member, said feed plate being shaped to admit only a limited number of spice grains at a time into the grinding space between said annular member and said rotor member.

* * * * *